United States Patent
Ramesh et al.

(10) Patent No.: US 8,407,180 B1
(45) Date of Patent: Mar. 26, 2013

(54) ELIMINATING INNER JOINS BASED ON A TEMPORAL RELATIONSHIP CONSTRAINT

(75) Inventors: Bhashyam Ramesh, Secunderabad (IN); Stephen A. Brobst, Henderson, NV (US)

(73) Assignee: Teradata US, Inc., Dayton, OH (US)

( * ) Notice: Subject to any disclaimer, the term of this patent is extended or adjusted under 35 U.S.C. 154(b) by 306 days.

(21) Appl. No.: 12/955,063

(22) Filed: Nov. 29, 2010

(51) Int. Cl.
*G06F 17/30* (2006.01)
*G06F 17/00* (2006.01)

(52) U.S. Cl. .................... 707/609; 707/802; 707/803

(58) Field of Classification Search .................. 707/609, 707/802, 803
See application file for complete search history.

(56) References Cited

U.S. PATENT DOCUMENTS

| | | | |
|---|---|---|---|
| 6,691,097 B1 * | 2/2004 | Saracco | 1/1 |
| 7,346,628 B2 * | 3/2008 | Porter | 1/1 |
| 7,499,907 B2 * | 3/2009 | Brown et al. | 1/1 |
| 8,219,522 B2 * | 7/2012 | Johnston et al. | 707/609 |

* cited by examiner

*Primary Examiner* — Yicun Wu
(74) *Attorney, Agent, or Firm* — Howard Speight

(57) ABSTRACT

A query is received. It is determined that the query includes an inner join between a parent table and a child table. It is determined that the following relationships exist between the parent table and the child table: referential integrity ("RI") between a primary key attribute (pk) in the parent table and a foreign key attribute (fk) in the child table, where "attribute" is defined to mean one or more columns, and a temporal relationship constraint ("TRC") between a period attribute in the parent table and a TRC-attribute in the child table, the TRC-attribute being a date or time attribute. It is determined that the query does not access any attribute in the parent table other than the pk. It is determined that the query specifies an equality predicate of the form pk=fk. It is determined that the query selects a snapshot from the parent using a predicate of the form parent.[period attribute] contains a point in time (t1). It is determined that the query selects from the child those rows whose TRC-attribute is equal to or prior to t1. The inner join is eliminated when planning execution of the query. The query is executed to produce a result. The result is saved.

18 Claims, 4 Drawing Sheets

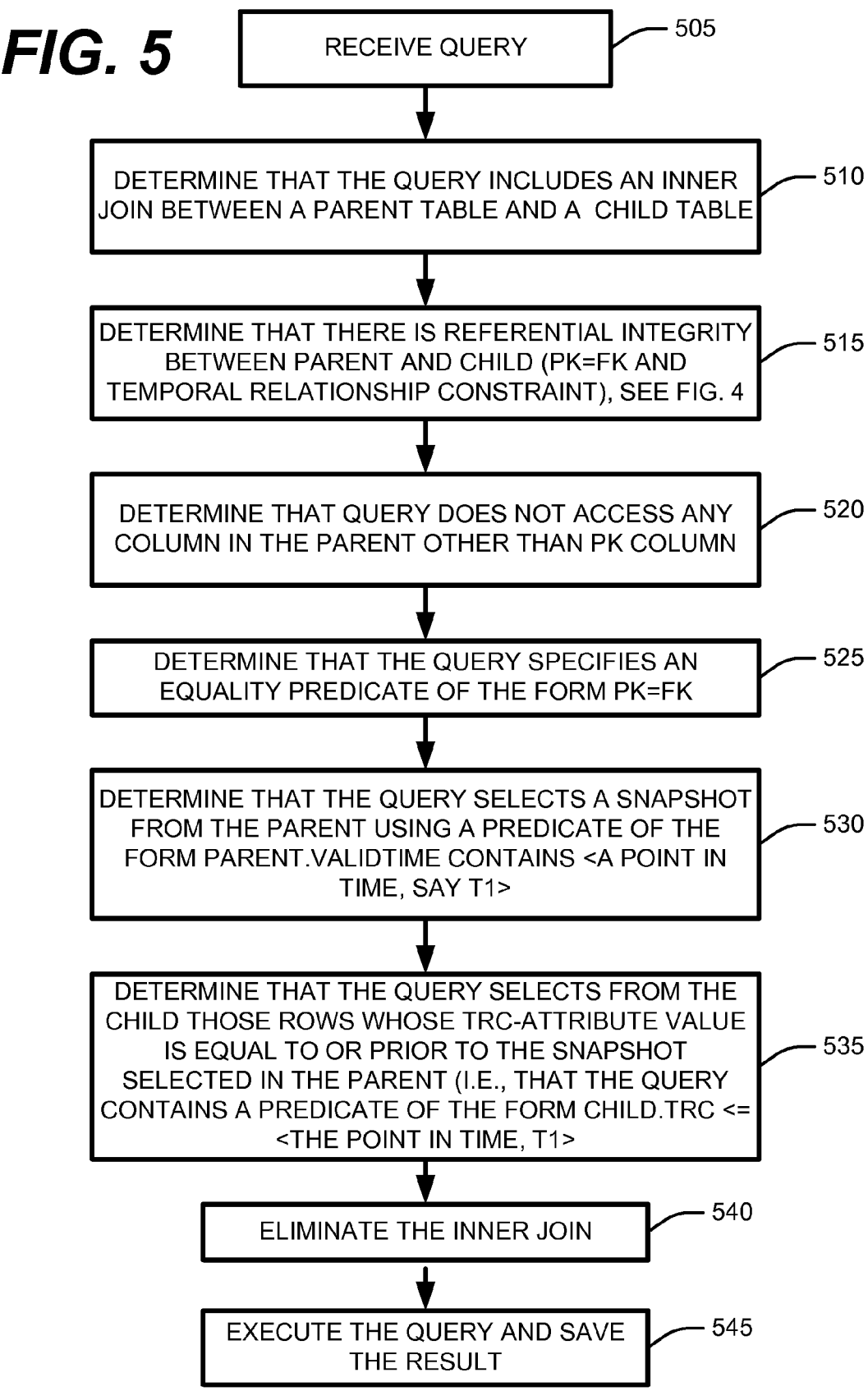

ELIMINATING INNER JOINS BASED ON A TEMPORAL RELATIONSHIP CONSTRAINT

BACKGROUND

A child-parent referential integrity ("RI") constraint between a parent table and a child table requires that a foreign key value in each child table row have a matching primary key value in a parent table row. Referential integrity is challenging in temporal databases.

SUMMARY

In general, in one aspect, the invention features a method. The method includes receiving a query. The method further includes determining that the query includes an inner join between a parent table and a child table. The method further includes determining that the following relationships exist between the parent table and the child table: referential integrity ("RI") between a primary key attribute (pk) in the parent table and a foreign key attribute (fk) in the child table, where "attribute" is defined to mean one or more columns; and a temporal relationship constraint ("TRC") between a period attribute in the parent table and a TRC-attribute in the child table, the TRC-attribute being a date or time attribute. The method further includes determining that the query does not access any attribute in the parent table other than the pk. The method further includes determining that the query specifies an equality predicate of the form pk=fk. The method further includes determining that the query selects a snapshot from the parent using a predicate of the form parent.[period attribute] contains a point in time (t1). The method further includes determining that the query selects from the child those rows whose TRC-attribute is equal to or prior to t1. The method further includes eliminating the inner join when planning execution of the query. The method further includes executing the query to produce a result. The method further includes saving the result.

Implementations of the invention may include one or more of the following. Determining that a temporal relationship exists between the period attribute in the parent table and the TRC-attribute in the child table may include determining that the parent table has a period attribute, determining that the TRC-attribute in the child table is not a period attribute, determining that the pk attribute in the parent table is temporally unique, determining that the TRC-attribute value in the child table is contained in the period column value in the parent table of the one or more parent table rows that satisfy the pk=fk predicate, determining that multiple rows in the parent table that have the same value for the pk attribute do not overlap or have gaps in the period column and that they continue forever or as long as the matching child row is present in the child table, and determining that rules are in place to prevent rows from being deleted from the parent table unless matching rows are previously deleted from the child table. The rules may be implemented by a rule implementer selected from a group consisting of a database management system that implements the method, a user that is using the database management system, and an application that accesses the database management system. The parent table may be a temporal table selected from the group of temporal tables consisting of a ValidTime table, a TransactionTime table, and a bi-temporal table. The period attribute in the parent table may be one or a group of period attributes consisting of (a) a ValidTime column and (b) two date/time columns defining a period. The child table may be a non-temporal table.

In general, in another aspect, the invention features a database system. The database system includes one or more nodes. The database system further includes a plurality of CPUs, each of the one or more nodes providing access to one or more CPUs. The database system further includes a plurality of virtual processors, each of the one or more CPUs providing access to one or more virtual processors. The database system further includes each virtual processor being configured to manage data, including rows from the set of database table rows, stored in one of a plurality of data-storage facilities. The database system further includes a process. The process receives a query. The process determines that the query includes an inner join between a parent table and a child table. The process determines that the following relationships exist between the parent table and the child table: referential integrity ("RI") between a primary key attribute (pk) in the parent table and a foreign key attribute (fk) in the child table, where "attribute" is defined to mean one or more columns, and a temporal relationship constraint ("TRC") between a period attribute in the parent table and a TRC-attribute in the child table, the TRC-attribute being a date or time attribute. The process determines that the query does not access any attribute in the parent table other than the pk. The process determines that the query specifies an equality predicate of the form pk=fk. The process determines that the query selects a snapshot from the parent using a predicate of the form parent.[period attribute] contains a point in time (t1). The process determines that the query selects from the child those rows whose TRC-attribute is equal to or prior to t1. The process eliminates the inner join when planning execution of the query. The process executes the query to produce a result. The process saves the result.

In general, in another aspect, the invention features a computer program, stored in a computer-readable tangible medium. The program includes executable instructions that cause a computer to receive a query. The program further includes executable instructions that cause the computer to determine that the query includes an inner join between a parent table and a child table. The program further includes executable instructions that cause the computer to determine that the following relationships exist between the parent table and the child table: referential integrity ("RI") between a primary key attribute (pk) in the parent table and a foreign key attribute (fk) in the child table, where "attribute" is defined to mean one or more columns, and a temporal relationship constraint ("TRC") between a period attribute in the parent table and a TRC-attribute in the child table, the TRC-attribute being a date or time attribute. The program further includes executable instructions that cause the computer to determine that the query does not access any attribute in the parent table other than the pk. The program further includes executable instructions that cause the computer to determine that the query specifies an equality predicate of the form pk=fk. The program further includes executable instructions that cause the computer to determine that the query selects a snapshot from the parent using a predicate of the form parent.[period attribute] contains a point in time (t1). The program further includes executable instructions that cause the computer to determine that the query selects from the child those rows whose TRC-attribute is equal to or prior to t1. The program further includes executable instructions that cause the computer to eliminate the inner join when planning execution of the query. The program further includes executable instructions that cause the computer to execute the query to produce a result. The program further includes executable instructions that cause the computer to save the result.

BRIEF DESCRIPTION OF THE DRAWINGS

FIGS. 4 and 5 are flow charts.

DETAILED DESCRIPTION

Figure 1:
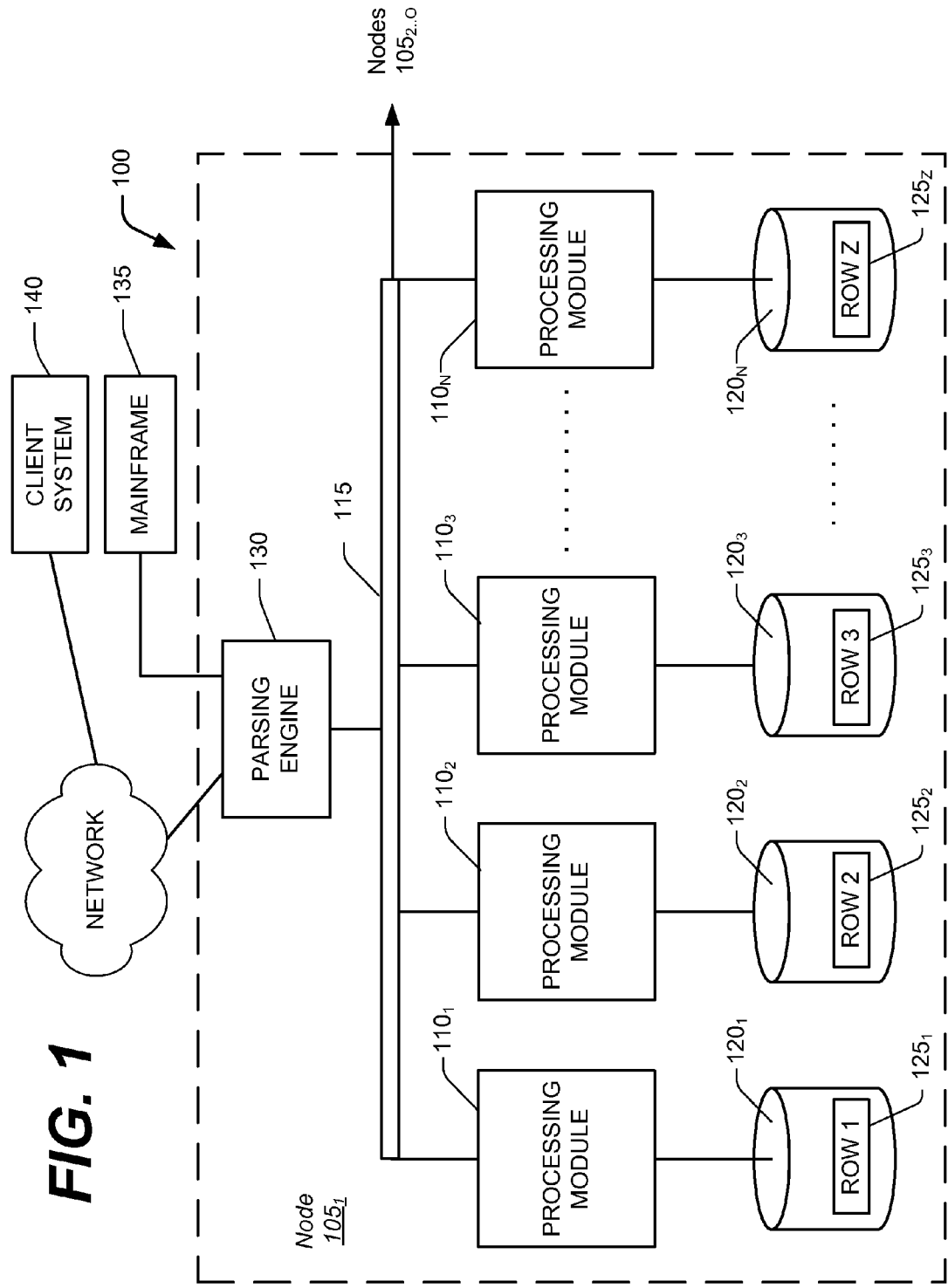
FIG. 1 is one example of a block diagram of a node of a database system.
Figure 2:
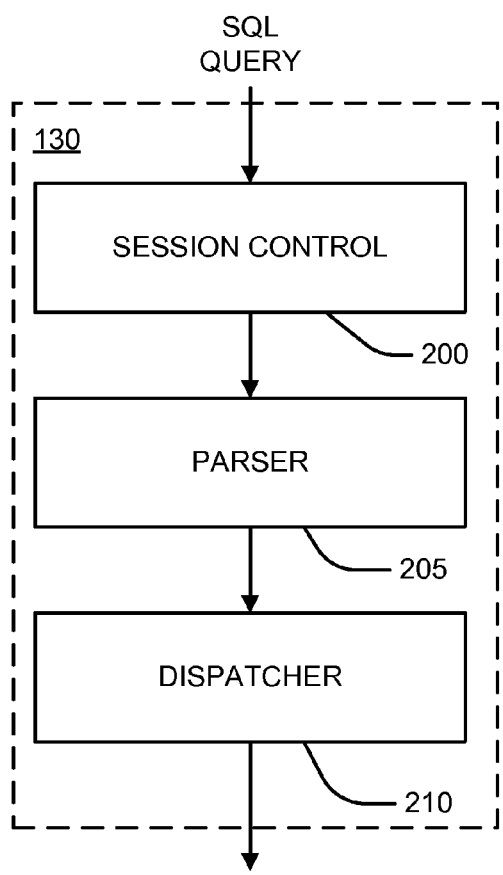
FIG. 2 is one example of a block diagram of a parsing engine.

The technique disclosed herein has particular application, but is not limited, to large databases that might contain many millions or billions of records managed by a database system ("DBS") 100, such as a Teradata Active Data Warehousing System available from the assignee hereof. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots N}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 3:
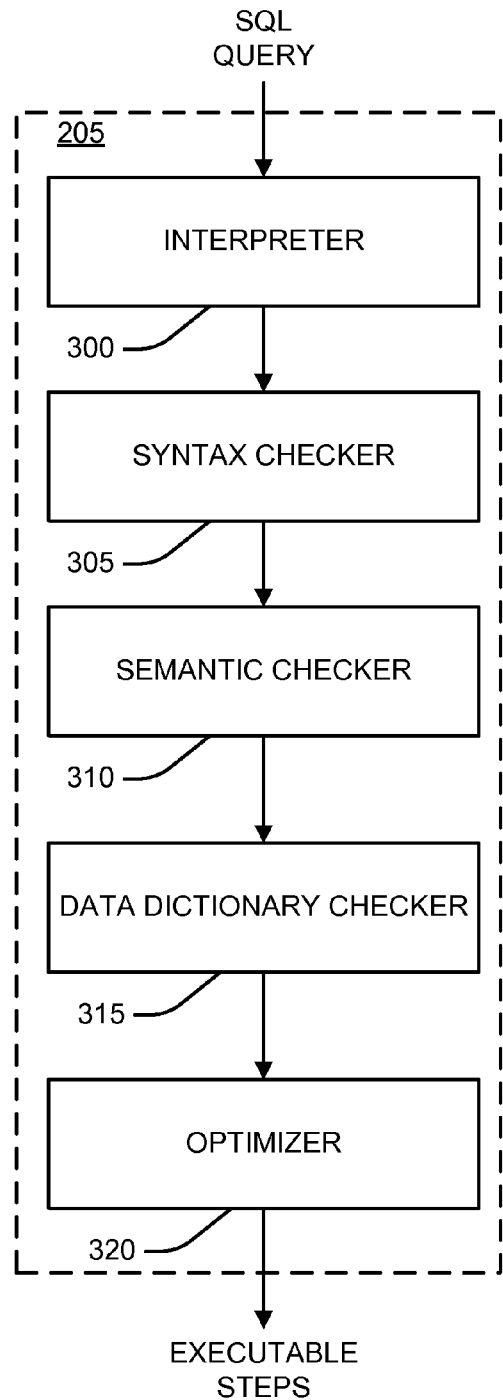
FIG. 3 is a flow chart of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $1101 \ldots N$ to implement the executable steps.

A temporal database management system is defined to be a database management system with built-in support for reasoning with time such as a temporal data model and a temporal version of SQL.

A temporal database is defined to be a database capable of inherently storing data (i.e., without the use of user-defined date or timestamp columns, or the like) that relates to time instances. Such a database provides temporal data types and stores information related to the past, present, and future. For example, it stores an inventory history or the movement of employees within an organization. While a conventional database can maintain temporal data, it is typically done using user-defined date or timestamp columns, or the like, which are maintained in a temporal manner with manual coding for data maintenance activities.

In one embodiment, there are three different fundamental kinds of time in a temporal database. The first type is user-defined times that are un-interpreted time values. Such times typically are defined as DateTime data types or Period data types.

In one embodiment, as is conventional, DateTime and Period data types are intrinsic types. In one embodiment, Period data types define a time period and include a beginning element that defines the beginning of the time period and an ending element that defines the end of the time period.

In one embodiment, the second fundamental kind of time in a temporal database is ValidTime, which is typically defined as a Period data type with an element type of DATE or TIMESTAMP, and which is defined to denote the time period during which a fact (typically represented as a row in a table) is true (or valid) with respect to the real world.

In one embodiment, the third fundamental kind of time in a temporal database is TransactionTime, which is typically defined as a Period data type with an element type of TIMESTAMP, and which is defined to denote the time period beginning when a fact was first known (or recorded in) the database and ending when superseded by an update to the fact or when the fact is deleted.

In one embodiment, the ValidTime and TransactionTime period values do not have to be the same for a row. In one embodiment, the three kinds of time are orthogonal. That is, a table can have one, two, or all three kinds of time, each providing a different dimension for reasoning on time. Indeed, a table can have an arbitrary number of user-defined times that may have meanings to the database, upstream source systems and/or processes, etc.

A ValidTime table is defined to be a table that has Valid-Time but not TransactionTime.

A TransactionTime table is defined to be a table that has TransactionTime but not ValidTime.

A bi-temporal table is defined to be a table that has both ValidTime and TransactionTime.

A temporal table is defined to be a table that has ValidTime and/or TransactionTime.

A non-temporal table is defined to be a table that has neither ValidTime nor TransactionTime.

A conventional referential integrity constraint ("RI") in a temporal database takes time into consideration in its definition. The definition requires that the primary key value be unique at every point in time. Furthermore, the primary key and the foreign key are required to match during the same period of time. Further, the child and parent tables are required to have ValidTime columns.

In one embodiment, a new form of temporal RI is referred to as a Temporal Relationship Constraint (or "TRC"). In one embodiment, the TRC is between a parent table with a period attribute ("attribute" is defined for the purposes of this application as one or more columns), such as two date/time columns (e.g., a begin_period column and an end_period column) or a Period data type column (e.g., a ValidTime column), and a child table that does not have a period attribute (e.g., a non-temporal table without a Period data type column or a TransactionTime table) or, if the child table has a period attribute, the TRC is not through the child's period attribute. An example of such a table is a child table that records transactions, such as a point-of-sale table.

In one embodiment, the TRC is defined between the following combinations of child and parent tables: a non-temporal child and a ValidTime parent, a non-temporal child and a bi-temporal parent, a non-temporal child and a non-temporal parent with a period attribute, a TransactionTime child and a parent with a ValidTime column.

In one embodiment, in addition to the conventional requirement of primary key ("pk") to foreign key ("fk") equality (or "pk-fk equality"), TRC includes a condition between the period column in the parent table and a date/timestamp column in the child table. In one embodiment, the child table's date/timestamp column (or columns) is referred to as the TRC-attribute.

In one embodiment of a TRC, as in conventional RI, each fk data column value has a matching pk data column value. In one embodiment, the pk columns are temporal unique, which means the pk column must be unique at any point in time. In one embodiment, the TRC-attribute, which can be one or more child table rows, identifies the time value at which the pk row is required to be valid. Furthermore, in one embodiment, the following meaning is associated with the TRC-attribute: it became known to the system at the date and/or time specified by the TRC-attribute value and it continues to be known forever from that point onwards. In other words, the pseudo validity (i.e., not using the temporal-database meaning of the word "validity") of the child row is from the moment it is recorded, as specified by the TRC-attribute value, to forever. In terms of temporal RI (non TRC) semantics, this means the parent's validity starts at or before the TRC-attribute value and continues forever without any breaks.

Figure 4:
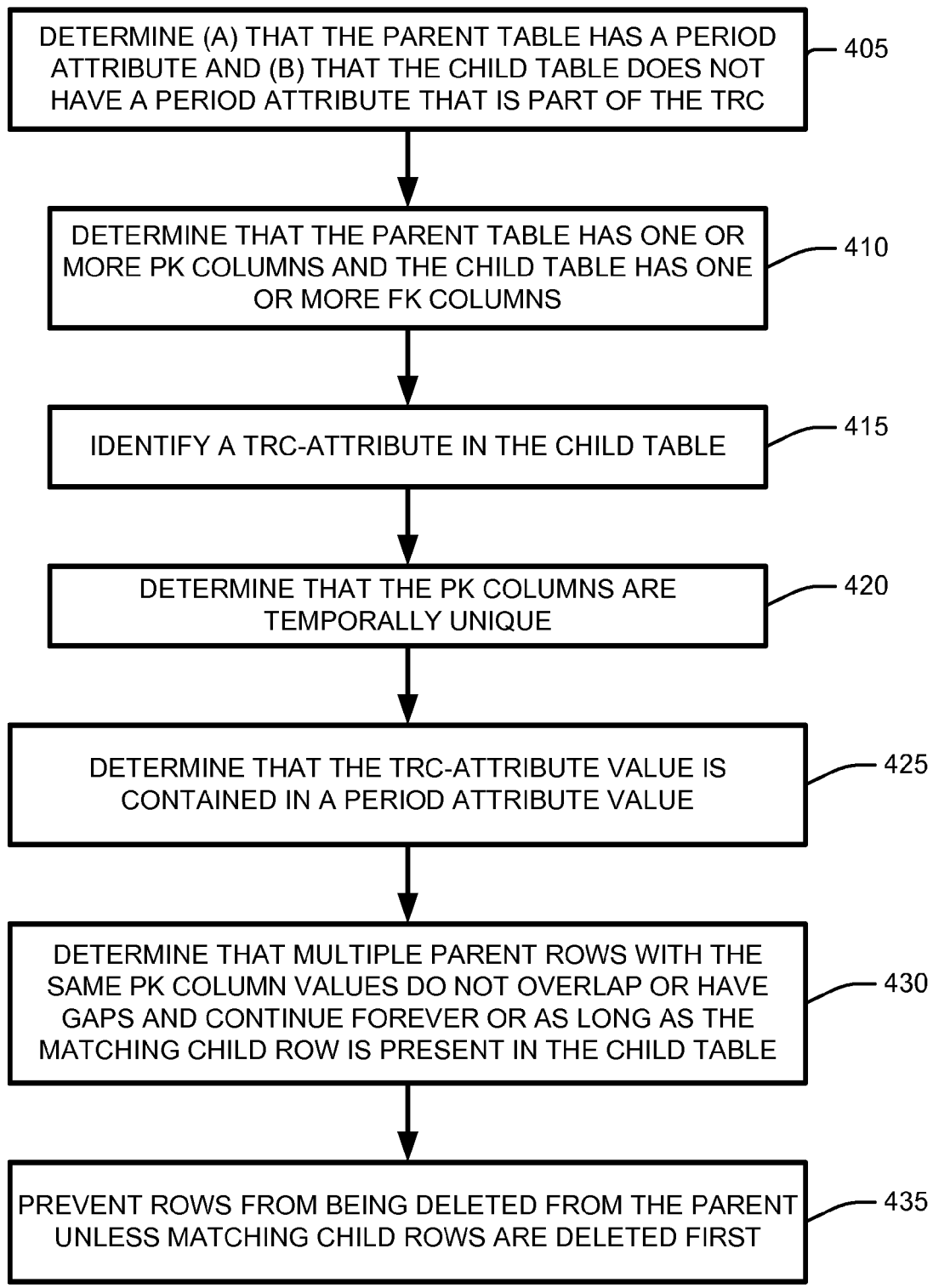

In one embodiment, the TRC constraint has the following requirements (the presence of which is investigated as shown in the procedure illustrated in FIG. 4):

1) The parent table has a period attribute (e.g., a begin_period column and an end_period column or a ValidTime column). The child table does not have a period attribute that is part of the TRC (block 405).
2) One or more pk data columns in the parent are identified along with one or more fk columns in the child (block 410). One DateTime column (i.e., a column having a date type or time type) of the child is identified as the TRC-attribute (block 415).
3) The pk column(s) of the parent is temporally unique (i.e., they are unique at all points in time) (block 420).
4) The TRC-attribute value in the child row is "contained" in the corresponding period attribute (e.g., ValidTime) value of the parent row with the matching pk column value(s) (block 425), where a child row is "contained" in a parent row if the value of the parent row's period attribute subsumes or includes the value of the child row's TRC-attribute value. For example, if the parent row's period attribute contains BEGIN as the beginning of the period and END as the end of the period and the period representation in the parent is INCLUSIVE-EXCLUSIVE (i.e., BEGIN is included in the period and END is excluded in the period) then CONTAINS means BEGIN<=TRC-attribute-value<END. If the period is INCLUSIVE-INCLUSIVE then BEGIN<=TRC-attribute-value<=END. Other combinations of INCLUSIVE/EXCLUSIVE are possible.
5) If the parent has multiple rows with the same pk values (which will not happen unless the parent is a temporal table) then the ValidTime column values of the different rows meet—the ValidTime column values of the multiple do not overlap and they do not have gaps. In addition the pk row's validity continues forever or as long as the child row is present in the child table (block 430). If the parent is a non-temporal table the end_period column is set to the end of time or some time very distant in the future, such as the year 2099 or the year 3099. For example a child table that records a sale for a product should be present in some product hierarchy in the parent for all times after the product is sold. This rule enables join elimination for any point in time after the child row is created.
6) Rules are in place to prevent a parent row from being deleted from the parent table—this will violate the above rule and produce a permanent gap in the parent's VT column. If a row needs to be deleted or a gap in VT is desired then the rules require the corresponding child rows to be first deleted from the child table (block 435).

In one embodiment, if any of the above conditions are violated the Temporal Relationship Constraint is said to be violated and a modification that causes the violation is disallowed.

In one embodiment, in "soft" TRC all of the above rules are the responsibility of the user or the user's application. The DBMS will not enforce them.

In one embodiment, from the perspective of an application, a child table is a fact table such as a point of sale table; parent tables are dimension tables such as product, store tables.

The following Data Manipulation Language ("DML") establishes a TRC that satisfies the above rules:

```
CREATE MULTISET TABLE product
    (prod_id VARCHAR(10),
    spec1 VARCHAR(100),
    spec2 VARCHAR(100),
    spec3 VARCHAR(100),
    vtcol PERIOD(DATE) AS VALIDTIME)
PRIMARY INDEX (prod_id);
CREATE MULTISET TABLE sales
    (id VARCHAR (10),
    description VARCHAR (100),
    sale_date DATE,
```

CONSTRAINT R1 FOREIGN KEY (id, sale_date) REFERENCES WITH NO CHECK OPTION product (prod_id, vtcol)) primary index(id);

In the example, the product table, which has a ValidTime column, is the parent table and the sales table, which does not have a ValidTime column, is the child table. Thus, the two tables satisfy rule 1.

A pk-fk RI constraint between product.prod_id (pk) and sales.id (fk) is established by the CONSTRAINT clause and the sales.sale_date column is established as the TRC-attribute in the DML creating the sales table. Thus, rule 2 is satisfied.

Suppose the product parent table has the following values:

| product (parent table) | | | | |
|---|---|---|---|---|
| prod_id | spec1 | spec2 | spec3 | vtcol |
| 1001 | 5 | 7 | blue | 2006-01-01, 2007-01-01 |
| 1002 | 8 | 10 | gold | 2006-01-01, UNTIL_CHANGED |
| 1001 | 5 | 7 | red | 2007-01-01, 2008-01-01 |
| 1001 | 5 | 7 | green | 2008-01-01, 2009-01-01 |
| 1001 | 5 | 7 | yellow | 2009-01-01, UNTIL_CHANGED | and the child sales table has the following values:

| sales (child table) | | |
|---|---|---|
| id | description | sale_date |
| 1001 | first sale | 2006-06-15 |
| 1001 | second sale | 2006-09-27 |
| 1001 | third sale | 2007-12-05 |
| 1001 | fourth sale | 2008-01-08 |
| 1001 | fifth sale | 2009-07-25 |

The pk column (prod_id) is temporally unique because, while spec3 changes over time for prod_id=1001, there is only one row having a value prod_id=1001 at any given point in time. Thus, rule 3 is satisfied.

The values of the TRC-attribute (sales.sale_date) are all within the ranges of the corresponding ValidTime values in the parent table. That is, the sale date of the first and second sales fall within the ValidTime period when product.spec3=blue, the sale date of the third sale falls within the ValidTime period when product.spec3=red, the sale date of the fourth sale falls within the ValidTime period when product.spec3=green, and the sale date of the fifth sale falls within the ValidTime period when product.spec3=yellow. Thus, rule 4 is satisfied.

The parent table has multiple rows with the same pk values (product.prod_id=1001) the ValidTime column values of those rows meet, as required by rule 5. That is, vtcol values for the various rows in which product.prod_id=1001 cover the dates from Jan. 1, 2006 to the end of time (or until the date at which UNTIL_CHANGED is defined, which is typically many years in the future) without overlap or gaps. Thus, rule 5 is satisfied.

No row is deleted from the parent table. Or, if a parent row is deleted, the corresponding child rows are deleted first. For example, if it is desired to delete the first row of the product table (in which product.spec3=blue), the first two rows, in which sales.sale_date occur in 2006, must be deleted first. Thus, rule 6 is satisfied and, as long as the rules continue to be satisfied, a TRC exists between the product table and the sales table.

In one embodiment, it is possible to simplify joins between a parent table and a child table having a TRC. In one embodiment, the simplification is performed by the optimizer 320 during a query execution planning process. In one embodiment, the simplification is performed by the optimizer 320 during a join planning portion of a query execution planning process.

In one embodiment, an inner join between a parent table and a child table having a TRC can be eliminated. Inner join elimination ("JE") is possible if the result is unaffected by whether the join is actually performed or not, that is, if resulting answer set is the same regardless of whether the join is performed or the join is eliminated and only the child table was used.

In a conventional nontemporal environment in which a relationship integrity (RI) constraint exists between a nontemporal child and a parent table the join elimination of the parent in a query which joins the child and the parent is possible if the query satisfies the following conditions:
1) The query does not access any column other than the pk column(s) from the parent table;
2) The query specifies an equality predicate of the form pk=fk;
3) The pk column(s) (either explicitly or by definition) is unique.

In one embodiment, illustrated in FIG. 5, in a query (block 505) that includes an inner join between a child table and a parent table (block 510), elimination of the inner join is possible if there is a TRC defined between the child and the parent table being joined in the query (block 515, which references the investigation described with respect to FIG. 4) and if the query satisfies the following conditions:
1) The query does not access any column other than the pk column(s) from the parent table (block 520);
2) The query specifies an equality predicate of the form pk=fk (block 525);
3) The query selects a snapshot from the parent table using a predicate of the form Parent.ValidTime (or the period attribute if the parent table does not include a ValidTime column) CONTAINS <a point in time, say t1>(block 530);
4) The query selects from the child those rows whose TRC-attribute value is equal to or prior to the snapshot selected in the parent, i.e., the point in time selected in the parent (block 535). That is, the query has a predicate of the form child.TRC-attribute<=<the point in time t1>. Note that if a snapshot is selected in the parent then the user selects only those child rows that precede that snapshot in order for TRC-based JE.

For example, consider the following query between the tables defined above:
NONSEQUENCED VALIDTIME
SELECT sales.id, sales.description, sales.sale_date
FROM sales, product
WHERE sales.id=product.prod_id AND
BEGIN(product.vtcol)<=date '2008-01-01' AND END(product.vtcol)>date '2008-01-01' AND sale_date<=date '2008-01-01';

The query satisfies the first requirement because it does not access any column from the parent table except product.product_id.

The query satisfies the second requirement because it specifies an equality predicate of the form pk=fk ("sales.id=product.prod_id").

The query satisfies the third requirement because it selects a snapshot from the parent table using a predicate of the form Parent.ValidTime CONTAINS<a point in time, say t1>("BE- GIN(product.vtcol)<=date '2008-01-01' AND END(product.vtcol)>date '2008-01-01'", that is product.vtcol "contains" 2008-01-01). In the example, t1 is 2008-01-01.

The query satisfies the fourth requirement because it selects from the child those rows whose TRC-attribute value is equal to or prior to the point in time selected in the parent ("sale_date<='2008-01-01'").

In one embodiment, the example query can be rewritten to eliminate the inner join between the sales table and the product table (block 540, see FIG. 5), in which the query is satisfied by a scan of child (i.e., a scan of the sales table for rows in which sale_date<=date '2008-01-01'). In one embodiment, this ability to eliminate the join will remain true as long as the TRC is defined and enforced.

In one embodiment, the rewritten query is executed and the result is saved (block 545).

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   receiving a query;
   determining that the query includes an inner join between a parent table and a child table;
   determining that the following relationships exist between the parent table and the child table:
     referential integrity ("RI") between a primary key attribute (pk) in the parent table and a foreign key attribute (fk) in the child table, where "attribute" is defined to mean one or more columns; and
     a temporal relationship constraint ("TRC") between a period attribute in the parent table and a TRC-attribute in the child table, the TRC-attribute being a date or time attribute;
   determining that the query does not access any attribute in the parent table other than the pk;
   determining that the query specifies an equality predicate of the form pk=fk;
   determining that the query selects a snapshot from the parent using a predicate of the form parent.[period attribute] contains a point in time (t1);
   determining that the query selects from the child those rows whose TRC-attribute is equal to or prior to t1;
   eliminating the inner join when planning execution of the query;
   executing the query to produce a result; and
   saving the result.

2. The method of claim 1 wherein determining that a temporal relationship exists between the period attribute in the parent table and the TRC-attribute in the child table comprises:
   determining that the parent table has a period attribute;
   determining that the TRC-attribute in the child table is not a period attribute;
   determining that the pk attribute in the parent table is temporally unique;
   determining that the TRC-attribute value in the child table is contained in the period column value in the parent table of the one or more parent table rows that satisfy the pk=fk predicate;
   determining that multiple rows in the parent table that have the same value for the pk attribute do not overlap or have gaps in the period column and that they continue forever or as long as the matching child row is present in the child table; and
   determining that rules are in place to prevent rows from being deleted from the parent table unless matching rows are previously deleted from the child table.

3. The method of claim 2 wherein the rules are implemented by a rule implementer selected from a group consisting of a database management system that implements the method, a user that is using the database management system, and an application that accesses the database management system.

4. The method of claim 1 wherein the parent table is a temporal table selected from the group of temporal tables consisting of a ValidTime table, a TransactionTime table, and a bi-temporal table.

5. The method of claim 1 wherein the period attribute in the parent table is one or a group of period attributes consisting of (a) a ValidTime column and (b) two date/time columns defining a period.

6. The method of claim 1 wherein the child table is a non-temporal table.

7. A database system comprising:
   one or more nodes;
   a plurality of CPUs, each of the one or more nodes providing access to one or more CPUs;
   a plurality of virtual processors, each of the one or more CPUs providing access to one or more virtual processors;
   each virtual processor configured to manage data, including rows from the set of database table rows, stored in one of a plurality of data-storage facilities;
   a process for:
     receiving a query;
     determining that the query includes an inner join between a parent table and a child table;
     determining that the following relationships exist between the parent table and the child table:
       referential integrity ("RI") between a primary key attribute (pk) in the parent table and a foreign key attribute (fk) in the child table, where "attribute" is defined to mean one or more columns; and
       a temporal relationship constraint ("TRC") between a period attribute in the parent table and a TRC-attribute in the child table, the TRC-attribute being a date or time attribute;
     determining that the query does not access any attribute in the parent table other than the pk;
     determining that the query specifies an equality predicate of the form pk=fk;
     determining that the query selects a snapshot from the parent using a predicate of the form parent[period attribute] contains a point in time (t1);
     determining that the query selects from the child those rows whose TRC-attribute is equal to or prior to t1;
     eliminating the inner join when planning execution of the query;
     executing the query to produce a result; and
     saving the result.

8. The system of claim 7 wherein determining that a temporal relationship exists between the period attribute in the parent table and the TRC-attribute in the child table comprises:
   determining that the parent table has a period attribute;
   determining that the TRC-attribute in the child table is not a period attribute;

determining that the pk attribute in the parent table is temporally unique;

determining that the TRC-attribute value in the child table is contained in the period column value in the parent table of the one or more parent table rows that satisfy the pk=fk predicate;

determining that multiple rows in the parent table that have the same value for the pk attribute do not overlap or have gaps in the period column and that they continue forever or as long as the matching child row is present in the child table; and determining that rules are in place to prevent rows from being deleted from the parent table unless matching rows are previously deleted from the child table.

9. The system of claim 8 wherein the rules are implemented by a rule implementer selected from a group consisting of a database management system that implements the method, a user that is using the database management system, and an application that accesses the database management system.

10. The system of claim 7 wherein the parent table is a temporal table selected from the group of temporal tables consisting of a ValidTime table, a TransactionTime table, and a bi-temporal table.

11. The system of claim 7 wherein the period attribute in the parent table is one or a group of period attributes consisting of (a) a ValidTime column and (b) two date/time columns defining a period.

12. The system of claim 7 wherein the child table is a non-temporal table.

13. A computer program, stored in a computer-readable tangible medium, the program comprising executable instructions that cause a computer to:

receive a query;

determine that the query includes an inner join between a parent table and a child table;

determine that the following relationships exist between the parent table and the child table:

referential integrity ("RI") between a primary key attribute (pk) in the parent table and a foreign key attribute (fk) in the child table, where "attribute" is defined to mean one or more columns; and a temporal relationship constraint ("TRC") between a period attribute in the parent table and a TRC-attribute in the child table, the TRC-attribute being a date or time attribute;

determine that the query does not access any attribute in the parent table other than the pk;

determine that the query specifies an equality predicate of the form pk=fk;

determine that the query selects a snapshot from the parent using a predicate of the form parent.[period attribute] contains a point in time (t1);

determine that the query selects from the child those rows whose TRC-attribute is equal to or prior to t1;

eliminate the inner join when planning execution of the query;

execute the query to produce a result; and save the result.

14. The method of claim 13 wherein, when determining that a temporal relationship exists between the period attribute in the parent table and the TRC-attribute in the child table, the computer:

determines that the parent table has a period attribute;

determines that the TRC-attribute in the child table is not a period attribute;

determines that the pk attribute in the parent table is temporally unique;

determines that the TRC-attribute value in the child table is contained in the period column value in the parent table of the one or more parent table rows that satisfy the pk=fk predicate;

determines that multiple rows in the parent table that have the same value for the pk attribute do not overlap or have gaps in the period column and that they continue forever or as long as the matching child row is present in the child table; and determines that rules are in place to prevent rows from being deleted from the parent table unless matching rows are previously deleted from the child table.

15. The method of claim 14 wherein the rules are implemented by a rule implementer selected from a group consisting of a database management system that implements the method, a user that is using the database management system, and an application that accesses the database management system.

16. The method of claim 13 wherein the parent table is a temporal table selected from the group of temporal tables consisting of a ValidTime table, a TransactionTime table, and a bi-temporal table.

17. The method of claim 13 wherein the period attribute in the parent table is one or a group of period attributes consisting of (a) a ValidTime column and (b) two date/time columns defining a period.

18. The method of claim 13 wherein the child table is a non-temporal table.

* * * * *